United States Patent [19]

Gupta

[11] Patent Number: 5,080,472
[45] Date of Patent: Jan. 14, 1992

[54] MULTIFOCAL OPTICAL LENS

[75] Inventor: Amitava Gupta, Pasadena, Calif.

[73] Assignee: Ioptex Research Inc., Calif.

[21] Appl. No.: 383,797

[22] Filed: Jul. 21, 1989

[51] Int. Cl.$^5$ .................. G02B 3/10; G02C 7/06; G02C 11/00; B29D 3/00

[52] U.S. Cl. ................... 359/652; 351/161; 359/721; 359/900

[58] Field of Search .............. 350/413, 417, 437; 351/161, 171

[56] References Cited

U.S. PATENT DOCUMENTS

| | | | |
|---|---|---|---|
| 3,472,581 | 10/1969 | Bronstein | 351/161 |
| 3,560,598 | 2/1971 | Neefe | 351/161 |
| 4,798,609 | 1/1989 | Grendahl | 351/161 |

Primary Examiner—Paul M. Dzierzynski
Assistant Examiner—Rebecca D. Gass
Attorney, Agent, or Firm—Jacobs & Jacobs

[57] ABSTRACT

A multifocal lens useful as a contact lens or implantable as an intraocular lens which comprises at least 3 zones, the first zone comprising a polymer of a specified refractive index, the second zone comprising a polymer having the same repeating units as the polymer comprising the first zone and having a specified refractive index differing from the refractive index of the polymer comprising the first zone by not more than 0.1 units and by not less than 0.01 units and the third zone between the first and second zones comprising a polymer having the same repeating units as the polymers comprising the first and second zones and having a refractive index continuously variable between that of the polymer comprising the first zone and that of the polymer comprising the second zone, the at least three zones being transparent and having no discontinuities visible to the human eye between the zones.

16 Claims, 1 Drawing Sheet

MULTIFOCAL OPTICAL LENS

The present invention relates to improvement in optical lenses by providing a multifocal lens which can be used as a contact lens or implanted as an intraocular lens which is free of discontinuities between adjacent focal zones.

Currently available multifocal optical lenses have discontinuities such as lines of demarcation between adjacent zones of different refractive indices. These discontinuities cause incident light to be scattered causing undesirable glare and aberration.

U.S. Pat. No. 3,472,581 describes a multifocal lens which is produced by machining a lens from a disc made of two materials of different refractive indices which have been fused together. At the junction between the two materials, there is a discontinuity which results in a scattering plane for incidental light which thus produces undesirable glare for the user.

U.S. Pat. No. 3,560,598 describes forming a two component disc by the sequential polymerization of two materials of differing refractive index. These polymeric materials, however, have a line of demarcation therebetween. Thus, incident light is scattered at the interface junction.

The present invention, therefore, comprises a multifocal lens which is useful as a contact lens or an intraocular lens for implantation which is free of discontinuities between adjacent zones by virtue of being constructed of polymeric material which has at least two common monomers in adjacent zones thereby causing a third zone to form between adjacent zones having a constituency essentially the same as that of the adjacent zones, but differing in proportion of monomers making up the polymers comprising the adjacent zones.

The term discontinuity as used herein referring to discontinuities between adjacent zones according to prior art lenses, refers to the presence of something which causes the scattering of light, glare and/or a distortion of image or discomfort to the person wearing the lens. Examples of typical discontinuities include the above, as well as, visible lines between adjacent zones.

Figure 1:
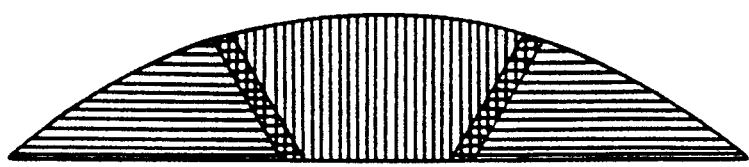
FIG. 1 is a view of a three zone multifocal lens according to the present invention.
Figure 2:
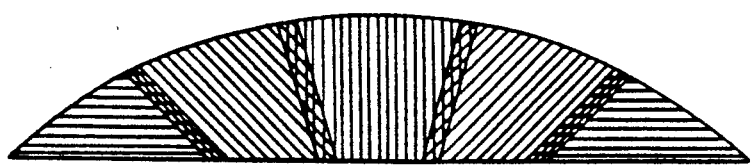
FIG. 2 shows a five zone multifocal lens according to the present invention.
Figure 3:
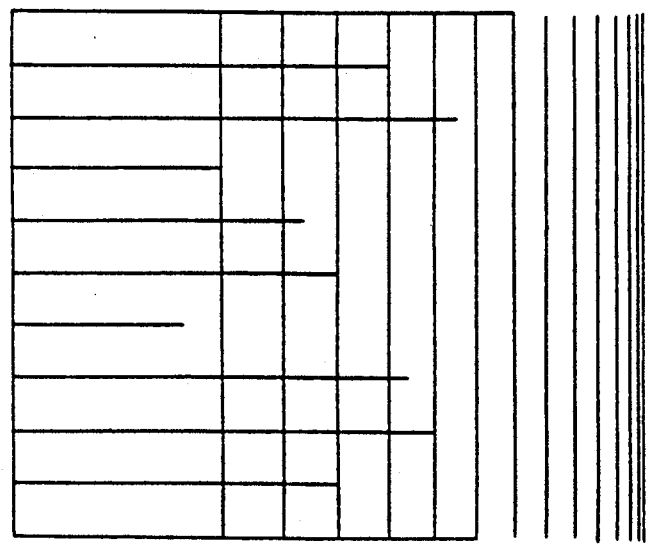
FIG. 3 is an expanded view of the third zone of the three zone multifocal lens according to the present invention.

More particularly, the present invention comprises a multifocal lens useful as a contact lens or implantable as an intraocular lens which comprises at least 3 zones, the first zone comprising a polymer of a specified refractive index, the second zone comprising a polymer having the same repeating units as the polymer comprising the first zone and having a specified refractive index differing from the refractive index of the polymer comprising the first zone by not more than 0.1 units and by not less than 0.01 units and the third zone between the first and second zones comprising a polymer having the same repeating units as the polymers comprising the first and second zones and having a refractive index continuously variable between that of the polymer comprising the first zone and that of the polymer comprising the second zone, the at least three zones being transparent and having no discontinuities visible to the human eye between the zones.

According to a further embodiment of the present invention, a multifocal lens is constructed having five zones wherein the fourth zone is adjacent the second zone and comprises a polymer having the same repeating units as the polymer comprising the first and second zones and has a specified refractive index differing from the refractive index of the polymer comprising the second zone by not more than 0.1 units and by not less than 0.02 units and the fifth zone between the second and fourth zones comprising a polymer having the same repeating units as the polymer comprising the first, second and fourth zones and having a refractive index continuously variable between that of the polymer comprising the second zone and that of the polymer comprising the fourth zone.

Based on technology presently available, there is not believed to be any advantage to having more than seven zones. Where the multifocal lens of the present invention is constructed having seven zones the fourth zone is adjacent the second zone and comprises a polymer having the same repeating units as the polymer comprising the first and second zones and has a specified refractive index differing from the refractive index of the polymer comprising the second zone by not more than 0.1 units and by not less than 0.02 units. The fifth zone between the second and fourth zones comprises a polymer having the same repeating units as the polymer comprising the first, second and fourth zones, and has a refractive index continuously variable between that of the polymer comprising the second zone and that of the polymer comprising the fourth zone. The sixth zone is adjacent the fourth zone and comprises a polymer having the same repeating units as the polymer comprising the first, second and fourth zones and has a specified refractive index differing from the refractive index of the polymer comprising the fourth zone by not more than 0.1 units and by not less than 0.02 units. The seventh zone is between the fourth and sixth zones and comprises a polymer having the same repeating units as the first, second, fourth and sixth zones and has a refractive index continuously variable between that of the polymer comprising the fourth zone and that of the polymer comprising the sixth zone.

It is important that the refractive index of the polymer comprising the adjacent zones differs by not more than 0.1 units and by not less than 0.01 units. Preferably, the refractive indices differ by not more than 0.05 units and by not less than 0.02 units.

Thus, according to a further embodiment of the present invention, the specified refractive index of the polymer of the first and second zones differ by not more than 0.05 units and by not less than 0.02 units.

According to a further embodiment of the present invention, the specified refractive index of the polymer of the second and fourth zones differ by not more than 0.05 units and by not less than 0.02 units.

According to a further embodiment of the present invention, the specified refractive index of the polymer of the fourth and sixth zones differ by not more than 0.05 units and by not less than 0.02 units.

As described above, the polymer comprising each zone comprises a mixture of at least two monomers.

According to a further embodiment of the present invention, each zone comprises a mixture of two monomers in a mole ratio of 80:20 to 20:80, preferably 70:30 to 30:70. In the case where each zone comprises a mixture of three or more monomers, at least two of the monomers are the same in adjacent zones and are present in the above noted mole ratios.

According to a further embodiment of the present invention, the polymers comprising each zone have a particle size less than 1,000 angstroms.

Preferred monomers for the polymers according to the present invention are methyl methacrylate, cyclohexyl methacrylate and trifluoro-ethyl methacrylate.

The present invention also comprises a method of making a multifocal lens useful as a contact lens or implantable as an intraocular lens which comprises polymerizing at least two suitable monomers $M_1$ and $M_2$ to form a polymer comprising a first zone having a specified refractive index into sheet form, removing polymeric material from the first zone to form a cavity, adding a mixture of monomers which contain at least monomers $M_1$ and $M_2$ in a mole ratio sufficient upon polymerization to form a polymer having a refractive index which differs from the refractive index of the polymer comprising the first zone of not more than 0.1 units and by not less than 0.01 units into the cavity, whereby a third zone forms between the first and second zones comprising a polymer having the same repeating units as the polymer comprising the first and second zones and having a refractive index continuously variable between that of the polymer comprising the first zone and that of the polymer comprising the second zone, the at least three zones being transparent and having no visible discontinuities between adjacent zones.

The polymeric material removed from the initially polymerized material may be removed by any suitable technique such as cutting discs, drilling or otherwise forming a pattern or cavity of patterns which are filled by subsequent monomers of the type above described. Thus, after forming the initial sheet of polymer and forming a cavity or pattern of cavities to form additional zones, the mixture of at least two monomers wherein at least two monomers are common to the adjacent zone is used to fill each subsequent cavity until the desired number of zones are produced.

The resulting completed sheet with a plurality of filled cavities therein comprising zones, may then be cut or otherwise machined to form a contact lens or an intraocular lens. In the case of an intraocular lens the lens may have haptics secured thereto according to techniques well know in the art or the intraocular lens may be formed with integral haptics according to techniques and procedures known in the art.

Table 1 below lists representative acrylic polymers and their refractive indices which polymers are useful according to the present invention. The refractive index of any copolymer can be calculated from this Table.

TABLE 1

| POLYMER | REFRACTIVE INDEX OF POLYMER |
| --- | --- |
| Poly(methyl acrylate) | 1.475 |
| Poly(ethyl acrylate) | 1.468 |
| Poly(ethylhexyl acrylate) | 1.465 |
| Poly(n-butyl acrylate) | 1.463 |
| Poly(trifluoroethyl acrylate) | 1.407 |
| Poly(methyl methacrylate) | 1.490 |
| Poly(ethyl methacrylate) | 1.495 |
| Poly(trifluoroethyl methacrylate) | 1.437 |
| Poly(n-butyl methacrylate) | 1.483 |
| Poly(cyclohexyl methacrylate) | 1.507 |
| Poly(benzyl methacrylate) | 1.568 |

According to the present invention, selected monomers in mole ratios of from about 80:20 to about 20:80 may be combined with a free radical initiator such as USP245 (e.g., 0.45 grams per 100 grams of monomer mixture). USP245 is believed to be a member of the class of aliphatic peroxides and comprises (2, 5-dimethyl-2,5-bis(2-ethyl hexoyl peroxy hexane. The mixture is then deaerated and poured into a glass mold consisting of tempered glass plates separated by a flexible gasket. The monomer mixture may be polymerized by holding the filled mold in a convection oven at about 55° C. for 16 hours and then at about 90° C. for 24 hours. After cooling the resultant clear monomer sheet may be removed from the mold and appropriate size disc, for example, size 16 mm size disc may be cut therefrom depending upon the number of zones desired. The discs may be cut therefrom by any suitable technique. A disc can be cut such that in cross section it forms a triangle if desired. The mold may comprise small upper and lower tempered plates separated and bounded by a flexible gasket and the cut disc may be placed in the mold with the upper surface exposed to receive a second monomer mixture. The second monomer mixture which comprises at least two monomers common to the first monomer mixture may be formed as above described for the first monomer mixture. A cavity or zone in the first monomer sheet may then be filled with a second monomer mixture and the second mixture is allowed to swell within the mold at room temperature for about 30 minutes under 1 atmosphere of dry nitrogen. The second monomer mixture is then polymerized as described above for the first monomer mixture at a temperature of from about 60° to 65° C. Subsequent zones are formed and filled as above described with monomer mixtures wherein at least two monomers of the monomer mixture are common to the monomer mixture of the adjacent zone or cavity.

Thus, for example, the first mixture of monomers may comprise poly(methyl methacrylate) 0.8 and co-(trifluoroethyl methacrylate) 0.2 and the second monomer mixture would comprise the same mixture of monomers but in a slightly different molar proportion. The resulting disc would have a constant gradient of refractive index ranging from about 1.507 to 1.437. An intraocular lens fabricated from the disc and designed to have a power of 20 diopters in an aqueous solution at its highest end will have a power of about 11.3 diopters at the other end.

The following nonlimitative examples more particularly illustrate the present invention.

EXAMPLE 1

A monomer formulation consisting of purified methyl methacrylate (95 g), trifluoroethyl methacrylate (40 g) 2-hydroxy 4-ethoxyacryloxy benzophenone (1.5 g) and ethylene glycol dimethacrylate (2.5 g) was mixed with a free radical initiator such as USP245 (0.25 g), then cast into a clear polymer sheet using thermal initiation. The monomer mixture was deaerated by bubbling high purity nitrogen gas through it for 5 minutes then poured into a mold consisting of two sheets of tempered glass separated by a flexible gasket. The mold was clamped at the edges and was placed in a bag which was flushed with nitrogen. The bag containing the mold was placed in a convection oven set at 55° C. The polymerization was complete in 16 hours. Following this reaction, the temperature of the oven was increased to 90° C., and the mold was held at this temperature for 24 hours. Then the oven was switched off and the mold opened to obtain the clear polymer sheet. 16 mm discs were machined from the sheet. The discs were milled to form cavities of conical cross-section therein. The cavities were filled with a deoxygenated liquid monomer mixture of methyl methacrylate (40 g) trifluoroethyl methacrylate (98 g), 2-hydroxy-4-ethoxyacryloxy benzophenone (1.5 g) and a free radical initiator (0.5 g) such as USP245.

The discs were placed between mold plates, and thermally polymerized. Following polymerization, a one piece, intraocular lens was fabricated from each disc. The lenses had a refractive index gradient at their central zones. In such zones, the power of the lenses decreased continuously and smoothly until at their centers it reached a value 0.63 times the power at their edges. In other words, a 20 diopter lens had a power at its center equal to 12.6 diopters. The third zone is formed by an interpenetrating network of the monomers which thus produces a zone between the first and second zones having a refractive index continuously variable between that of the polymer comprising the first zone and that of the polymer comprising the second zone.

EXAMPLE 2

A clear polymer sheet was cast by polymerization (as previously described) from the formulation described below:

| | |
|---|---|
| cyclohexyl methacrylate (monomer A) | 80 g |
| trifluoroethyl methacrylate (monomer B) | 13.5 g |
| ethylene glycol dimethacrylate (cross-linking agent) | 0.2-1.5 g |
| 2-hydroxy 2-ethoxyacryloxy benzophenone (UV absorber) | 1.5 g |
| Free radical initiator (e.g. USP245) | 0.5 g |

The sheet was cut into discs each with one or more cavities therein. The cavities were filled with the formulation described below:

| | |
|---|---|
| cyclohexyl methacrylate (monomer A) | 40 g |
| trifluoroethyl methacrylate (monomer B) | 56 g |
| ethylene glycol dimethacrylate (cross-linking agent) | 0-1.5 g |
| 2-hydroxy 4-ethoxyacryoxy benzophenone (UV absorber) | 1.5 g |
| Free radical initiator (e.g. USP245) | 0.5 g |

After the cavities formed in the first sheet were filled as above described with the monomer mixtures in the desired mole ratios they were polymerized to form up to seven zones. In the case of the seven zone multifocal lens, the zones or cavities are drilled for the first, second, fourth and sixth zones and the third, fifth and seventh zones are formed as above described between the first and second, second and fourth and fourth and sixth zones respectively.

What is claimed is:

1. A multifocal lens useful as a contact lens or implantable as an intraocular lens which comprises at least 3 zones, the first zone comprising a polymer of a specified refractive index, the second zone comprising a polymer having at least two monomers common to the monomer mixture of the polymer comprising the first zone and having a specified refractive index differing from the refractive index of the polymer comprising the first zone by not more than 0.1 units and by not less than 0.01 units and the third zone between the first and second zones comprising a polymer having at least two monomers common to the monomer mixture of the polymers comprising the first and second zones and having a refractive index continuously variable between that of the polymer comprising the first zone and that of the polymer comprising the second zone, the at least three zones being transparent and having no discontinuities visible to the human eye between the zones.

2. A multifocal lens according to claim 1 having five zones wherein the fourth zone is adjacent the second zone and comprises a polymer having at least two monomers common to the monomer mixture of the polymer comprising the first and second zones and has a specified refractive index differing from the refractive index of the polymer comprising the second zone by not more than 0.1 units and by not less than 0.02 units and the fifth zone between the second and fourth zones comprising a polymer having at least two monomers common to the monomers mixture of the polymer comprising the first, second and fourth zones and having a refractive index continuously variable between that of the polymer comprising the second zone and that of the polymer comprising the fourth zone.

3. A multifocal lens according to claim 2 wherein the specified refractive index of the polymer of the second and fourth zones differ by not more than 0.05 units and by not less than 0.02 units.

4. A method of making a multifocal lens of claim 2 which comprises polymerizing at least two suitable monomers $M_1$ and $M_2$ to form a polymer comprising a first zone having a specified refractive index into sheet form, removing polymeric material from the first zone to form two cavities, adding a mixture of monomers which contain at least monomers $M_1$ and $M_2$ in a mole ratio sufficient upon polymerization to form a polymer having a refractive index which differs from the refractive index of the polymer comprising the first zone if not more than 0.1 units and by not less than 0.01 units into the two cavities, thereby forming a third zone between the first and second zones and a fifth zone between the second and fourth zones which comprise a polymer having at least two monomers common to the monomer mixture of the polymer of the other zones and having a refractive index continuously variable between that of the polymer comprising the other zones, the zones being transparent and having no visible discontinuities between adjacent zones.

5. A multifocal lens according to claim 1 having seven zones wherein the fourth zone is adjacent the second zone and comprises a polymer having at least two monomers common to the monomer mixture of the polymer comprising the first and second zones and has a specified refractive index differing from the refractive index of the polymer comprising the second zone by not more than 0.01 units and by not less than 0.02 units, the fifth zone between the second and fourth zones comprising a polymer having at least two monomers common to the monomer mixture of the polymer comprising the first, second and fourth zones, and having a refractive index continuously variable between that of the polymer comprising the second zone and that of the polymer comprising the fourth zone, the sixth zone is adjacent the fourth zone and comprises a polymer having at least two monomers common to the monomer mixture of the polymer comprising the first, second and fourth zones and having a specified refractive index differing from the refractive index of the polymer comprising the fourth zone by not more than 0.1 units and by not less than 0.02 units and the seventh zone between the fourth and sixth zones comprising a polymer having at least two monomers common to the monomer mixture of the first, second, fourth and sixth zones and having a refractive index continuously variable between that of the polymer comprising the fourth zone and that of the polymer comprising the sixth zone.

6. A multifocal lens according to claim 5 wherein the specified refractive index of the polymer of the fourth and sixth zones differ by not more than 0.05 units and by not less than 0.02 units.

7. A method of making a multifocal lens according to claim 5 which comprises polymerizing at least two suitable monomers in $M_1$ and $M_2$ to form a polymer comprising a first zone having a specified refractive index into sheet form, removing polymeric material from the first zone to form three cavities, adding a mixture of monomers which contain at least monomers $M_1$ and $M_2$ in a mole ratio sufficient upon polymerization to form a polymer having a refractive index which differs from the refractive index of the polymer of the first zone by not more than 0.1 units and by not less than 0.01 units into the three cavities, thereby forming a zone between the first and second zones, a zone between the second and third zones and a zone between the third and fourth zones, each comprising a polymer having at least two monomers common to the monomer mixture of the polymer comprising the other zones and having a refractive index continuously variable between that of the polymer comprising the other zone, the zones being transparent and having no visible discontinuities between adjacent zones.

8. A multifocal lens according to claim 1 wherein the specified refractive index of the polymer of the first and second zones differ by not more than 0.05 units and by not less than 0.02 units.

9. A multifocal lens according to claim 1 wherein the polymer comprising each zone comprises a mixture of at least two monomers.

10. A multifocal lens according to claim 9 wherein two of the monomers are present in a mole ratio of 80:20 to 20:80.

11. A multifocal lens according to claim 9 wherein two of the monomers are present in a mole ratio of 70:30 to 30:70.

12. A multifocal lens according to claim 9 wherein the polymer comprising each zone comprises a mixture of three monomers wherein at least two monomers are the same in adjacent zones.

13. A multifocal lens according to claim 9 wherein one monomer is methyl methacrylate and a second monomer is trifluoro-ethylmethacrylate.

14. A multifocal lens according to claim 9 wherein one monomer is cycloexyl methacrylate and a second monomer is tri-fluoroethylmethacrylate.

15. A multifocal lens according to claim 1 wherein the polymers comprising each zone have a particle size less than 1,000 angstroms.

16. A method of making a multifocal lens of claim 1 which comprises polymerizing at least two suitable monomers $M_1$ and $M_2$ to form a polymer comprising a first zone having a specified refractive index into sheet form, removing polymeric material from the first zone to form a cavity, adding a mixture of monomers which contain at least monomers $M_1$ and $M_2$ in a mole ratio sufficient upon polymerization to form a polymer having a refractive index which differs from the refractive index of the polymer comprising the first zone of not more than 0.1 units and by not less than 0.01 units into the cavity, whereby a third zone forms between the first and second zones comprising a polymer having at least two monomers common to the monomer mixture of the polymer comprising the first and second zones and having a refractive index continuously variable between that of the polymer comprising the first zone and that of the polymer comprising the second zone, the at least three zones being transparent and having no visible discontinuities between adjacent zones.

* * * * *

REEXAMINATION CERTIFICATE (2715th)
United States Patent [19]

Gupta

[11] B1 5,080,472

[45] Certificate Issued Oct. 31, 1995

[54] MULTIFOCAL OPTICAL LENS

[75] Inventor: Amitava Gupta, Pasadena, Calif.

[73] Assignee: Ioptex Research, Inc., Azusa, Calif.

Reexamination Request:
No. 90/002,745, Jun. 4, 1992

Reexamination Certificate for:
Patent No.: 5,080,472
Issued: Jan. 14, 1992
Appl. No.: 383,797
Filed: Jul. 21, 1989

[51] Int. Cl.$^6$ .............................. G02B 3/10; G02C 7/06
[52] U.S. Cl. .................. 359/652; 351/161; 359/721; 359/900
[58] Field of Search .......................... 359/652, 721, 359/900; 351/161, 168–172

[56] References Cited

U.S. PATENT DOCUMENTS 4,944,584  7/1990  Maeda et al. ................ 351/172

FOREIGN PATENT DOCUMENTS

| 2600174 | 6/1987 | France . |
|---|---|---|
| 60-162611 | 8/1985 | Japan . |
| 60-175009 | 9/1985 | Japan . |
| 1152107 | 6/1989 | Japan . |

*Primary Examiner*—Scott J. Sugarman

[57] ABSTRACT

A multifocal lens useful as a contact lens or implantable as an intraocular lens which comprises at least 3 zones, the first zone comprising a polymer of a specified refractive index, the second zone comprising a polymer having the same repeating units as the polymer comprising the first zone and having a specified refractive index differing from the refractive index of the polymer comprising the first zone by not more than 0.1 units and by not less than 0.01 units and the third zone between the first and second zones comprising a polymer having the same repeating units as the polymers comprising the first and second zones and having a refractive index continuously variable between that of the polymer comprising the first zone and that of the polymer comprising the second zone, the at least three zones being transparent and having no discontinuities visible to the human eye between the zones.

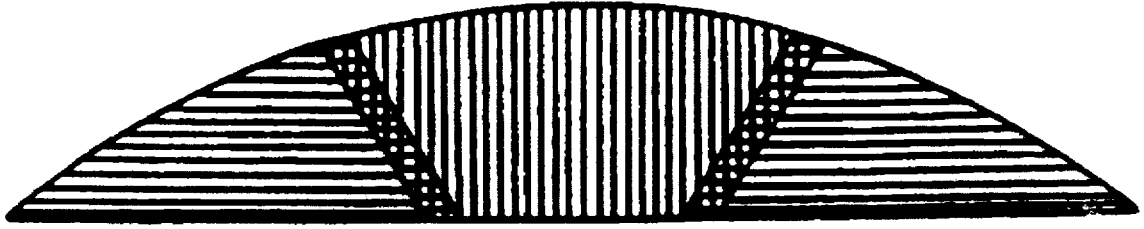

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4, 7 and 16 is confirmed.

Claims 1-3, 5, 6 and 8-15 are cancelled.

* * * * *